United States Patent
Yaguchi et al.

(10) Patent No.: US 11,885,399 B2
(45) Date of Patent: Jan. 30, 2024

(54) POWER TRANSMISSION DEVICE

(71) Applicant: GKN Automotive Limited, Birmingham (GB)

(72) Inventors: Yuu Yaguchi, Tochigi (JP); Toshiaki Komatsu, Auburn Hills, MI (US); Masato Horiguchi, Tochigi (JP); Toshiyuki Kikuchi, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/298,641

(22) Filed: Apr. 11, 2023

(65) Prior Publication Data

US 2023/0243409 A1 Aug. 3, 2023

Related U.S. Application Data

(63) Continuation of application No. PCT/JP2020/043148, filed on Nov. 19, 2020.

(51) Int. Cl.
*F16H 48/34* (2012.01)
*F16H 48/24* (2006.01)

(52) U.S. Cl.
CPC .......... *F16H 48/24* (2013.01); *F16H 48/34* (2013.01); *F16H 2048/346* (2013.01)

(58) Field of Classification Search
CPC .... F16H 48/24; F16H 48/34; F16H 2048/346; F16H 2048/204; F16H 48/30; F16H 27/09; F16H 27/118
See application file for complete search history.

(56) References Cited

U.S. PATENT DOCUMENTS

| | | | | |
|---|---|---|---|---|
| 2010/0144478 A1* | 6/2010 | Fan | ......................... | F16H 48/30 475/231 |
| 2020/0141476 A1* | 5/2020 | Zink | ...................... | F16D 13/52 |

FOREIGN PATENT DOCUMENTS

| | | | | |
|---|---|---|---|---|
| CN | 110388438 | * | 10/2019 | |
| DE | 3908478 A1 | * | 10/1989 | |
| DE | 10310713 A1 | * | 9/2003 | ............. F16H 48/08 |
| JP | 200397597 A | | 4/2003 | |
| JP | 2003172429 A | | 6/2003 | |

(Continued)

OTHER PUBLICATIONS

International Search Report and Written Opinion dated Jan. 12, 2021 for PCT/JP2020/043148 (10 pages).

*Primary Examiner* — Justin Holmes
(74) *Attorney, Agent, or Firm* — Bejin Bieneman PLC

(57) ABSTRACT

A power transmission device is provided with: a rotary body arranged to receive the torque to rotate about an axis; a clutch including a clutch member engaging with the rotary body and axially movable and clutch teeth connectable with the clutch member to transmit the torque; a solenoid configured to generate a magnetic flux in response to input of electric power; a stator coupled with the solenoid as to conduct the magnetic flux and prevented from rotation about the axis; a rotor arranged to receive the magnetic flux from the stator and, when driven by the received magnetic flux, to create a rotational motion about the axis; and a conversion mechanism drivingly connected with the rotor to convert the rotational motion into a linear motion in a direction along the axis, the conversion mechanism including a thrust member transmitting the linear motion to the clutch member.

13 Claims, 15 Drawing Sheets

(56) References Cited

FOREIGN PATENT DOCUMENTS

| | | | |
|---|---|---|---|
| JP | 2004125145 | A | 4/2004 |
| JP | 2004316893 | A | 11/2004 |
| JP | 201882610 | A | 5/2018 |
| JP | 2019521304 | A | 7/2019 |
| WO | 2016035129 | A1 | 3/2016 |
| WO | 2018109874 | A1 | 6/2018 |

\* cited by examiner

POWER TRANSMISSION DEVICE

CROSS-REFERENCE TO RELATED APPLICATIONS

This application is a continuation Application of, and as such claims priority to, PCT International Application No. PCT/JP2020/043148 (filed Nov. 19, 2020), the contents of which are incorporated herein by reference in their entirety.

BACKGROUND

Rotary machines applied to vehicles often use clutches in order to selectively execute and halt these functions. A so-called lock-up differential for example has a built-in dog clutch that is normally disconnected to enable differential motion between output axles and, when connected by an external actuator, locks up the differential motion.

An actuator such as a hydraulic cylinder, a cam mechanism using a motor, or a solenoid actuator, as it is capable of linearly moving, is readily available for connecting and disconnecting a dog clutch. Because an actuator must keep still whereas a rotary machine rotates, and as well the actuator occupies considerable dimensions for itself, an actuator by a hydraulic cylinder or a motor cam mechanism requires a relatively large structure projecting transversely from a shaft of the rotary machine. This is a factor that limits design of the vehicle body. Further, installation of the total structure into a vehicle body requires a step of installing the actuator, a step of installing the rotary machine and further a step of combining them, for example, and is thus very laborious.

In solenoid actuators, some devices have been proposed, which can be installed coaxially with the rotary machines and also are sufficiently compact so that the total bodies can be unitarily handled. PCT International Publications WO 2016/035129 A1 and WO 2018/109874 A1 disclose related arts.

Although a solenoid actuator could offer various advantages, there may be an issue that its action is not always reflected in states of the clutch. More specifically, even when electric power is put into the actuator, clutch teeth might fail to mesh with each other in a rare condition where the clutch teeth are not in proper positional relation for example. Or, even when the electric power is switched off, the clutch teeth can temporarily adhere to each other and be left disconnected as influenced by viscosity of lubricant oil or magnetization. Thus, in some cases, any additional device is sometimes required to detect whether the clutch is connected or not in order to prevent unforeseen actions. However, as will be understood from drawings in WO 2018/109874 A1, because such a detection device further requires some additional elements on its carrier and these elements require installation work independent of those for the differential of itself, and consequently the benefits offered by the solenoid actuator could be reduced.

SUMMARY

The disclosure herein relates to a power transmission device that disconnectably transmits torque for driving a vehicle, and particularly to a power transmission device capable of driving a clutch both into a connecting mode and into a disconnecting mode. The device disclosed hereafter has been achieved in view of the aforementioned issues.

According to an aspect, a power transmission device disconnectably transmitting torque for driving a vehicle is provided with: a rotary body capable of receiving the torque to rotate about an axis; a clutch including a clutch member engaging with the rotary body and axially movable and clutch teeth capable of connecting with the clutch member to transmit the torque; a solenoid generating a magnetic flux in response to input of electric power; a stator so coupled with the solenoid as to conduct the magnetic flux and anti-rotated about the axis; a rotor so disposed as to receive the magnetic flux from the stator and, as driven by the received magnetic flux, creating a rotational motion about the axis; and a conversion mechanism so drivingly connected with the rotor as to convert the rotational motion into a linear motion in a direction along the axis, the conversion mechanism including a thrust member transmitting the linear motion to the clutch member.

DESCRIPTION OF EXEMPLARY EMBODIMENTS

Exemplary embodiments will be described hereinafter with reference to the appended drawings. Throughout the following descriptions and appended claims, unless otherwise described, an axis means a central axis of a stator and a rotor, which is normally consistent with a rotation axis of a rotary body and a shaft connected to the rotary body. Drawings are not necessarily to scale and therefore it is particularly noted that dimensional relations are not limited to those drawn therein.

A combination of a clutch and an actuator disclosed hereafter may be combined with a rotary machine for a vehicle to constitute a power transmission device and is usable for connecting and disconnecting the clutch from the exterior of the rotary machine to control its function. When the clutch is connected, torque for driving the vehicle is transmitted via the clutch and, when the clutch is disconnected, the torque is cut off. As should be understood from the following descriptions, because an angle of rotation is reflected in a position of the clutch member, appropriate control of the angle of rotation of the actuator by normal and reverse rotation leads to attainment of a desired state in the clutch.

Figure 1:
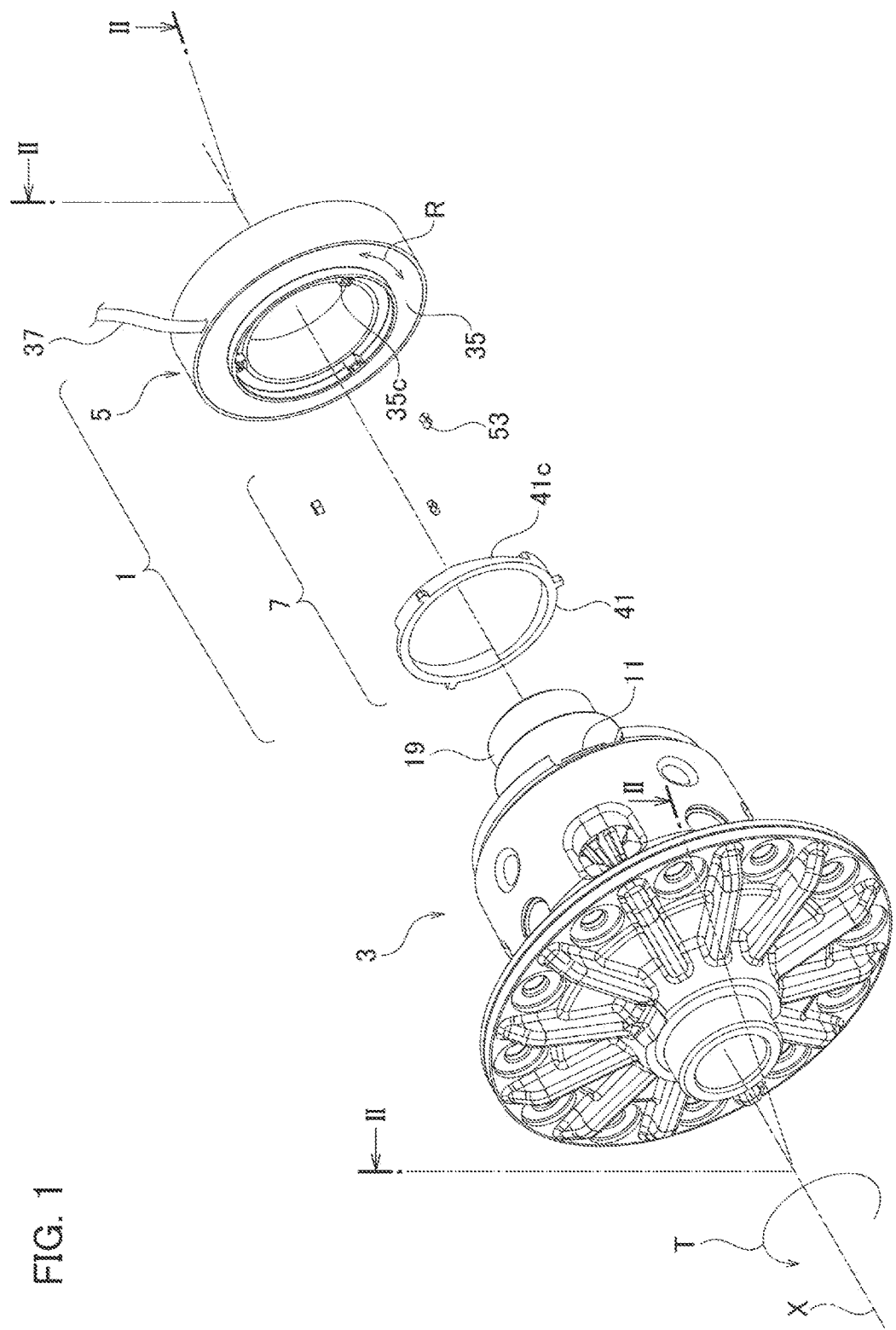
FIG. 1 is a partially exploded perspective view of a combination of a lock-up differential and an actuator.
Figure 2:
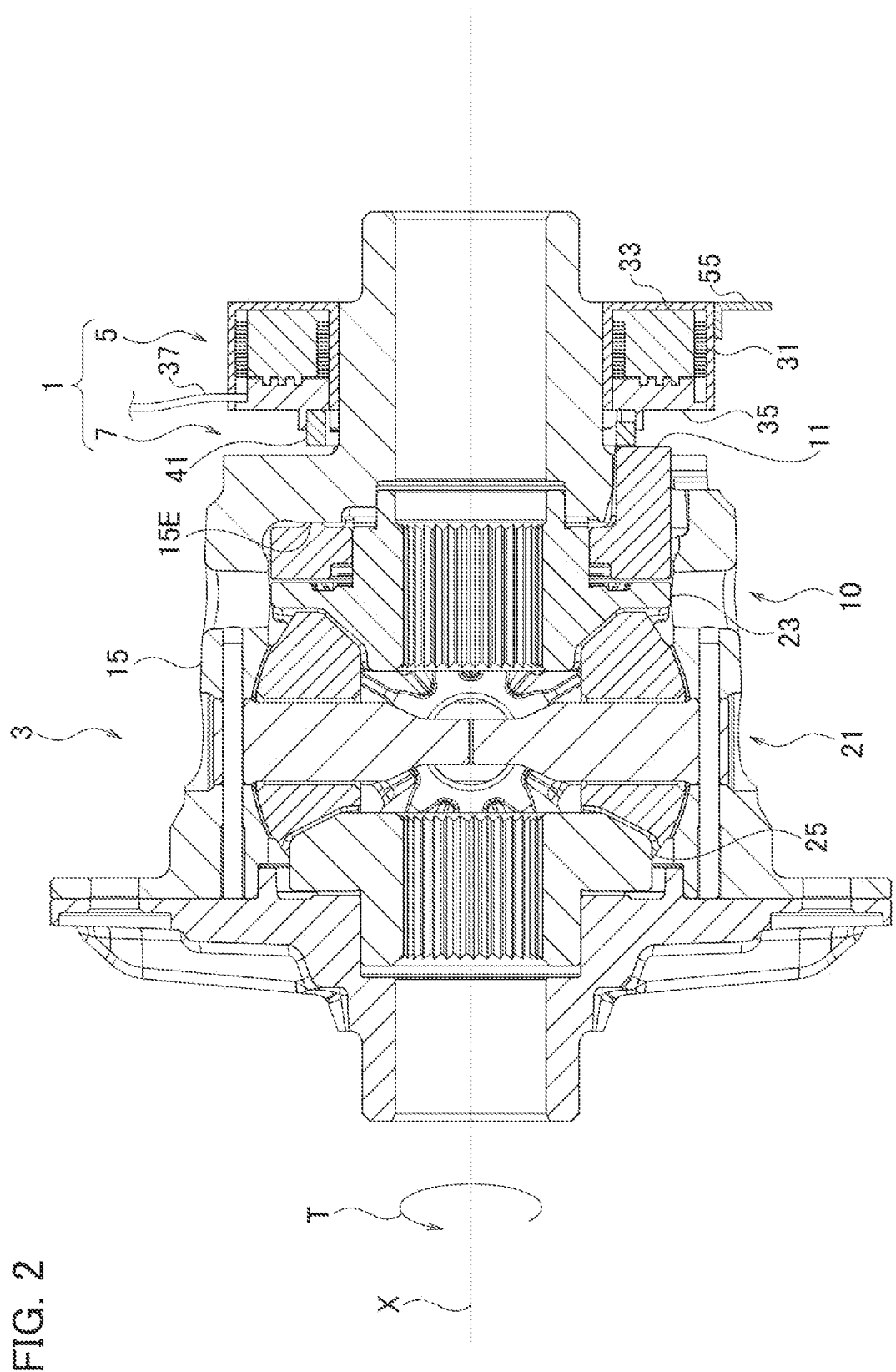
FIG. 2 is a sectional elevational view of the combination of the lock-up differential and the actuator, taken along a line II-II of FIG. 1.

While it is applicable to various rotary machines, one example is a differential for differentially distributing torque to right and left axles. The differential often includes a built-in dog clutch for the purpose of controlling its action, which is driven by a suitable actuator from the exterior. On the other hand, the vehicle has limited space for carrying the differential and, as its entirety including the actuator is thus required to be structured in a compact form, the actuator according to this disclosure is applicable to the vehicle. FIGS. 1 and 2 for example relate to an example in which a so-called lock-up differential is combined therewith, and FIG. 3 relates to another example in which a so-called free-running differential is combined therewith.

Referring mainly to FIG. 2 in combination with FIG. 1, a differential 3 is a rotary body capable of a rotary motion T about an axis X, which is provided with a clutch 10 in its interior. The differential 3 is provided with a differential gear set 21 coupled with its case 15, and the differential gear set 21 is provided with side gears 23, 25 respectively coupled to axles. More specifically, the differential gear set 21 functions as a medium for allowing differential motion between, and distributing torque received by the case 15, to the side gears 23, 25. While FIG. 2 illustrates an example of a bevel gear type, of course, alternatively applicable is any other type such as a face gear or a planetary gear.

Figure 7:
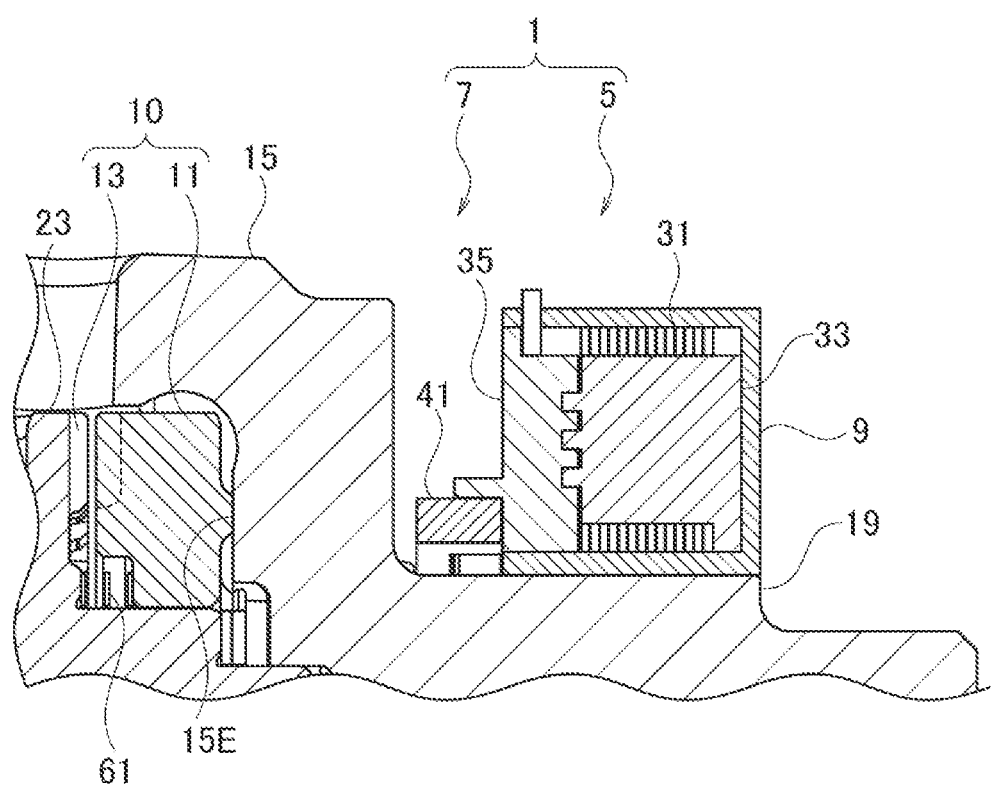
FIG. 7 is a sectional elevational view to particularly show the actuator shown in FIG. 2 as an enlarged view.

In the illustrated example, a clutch member 11 transmitting torque from the case 15 is axially movable, and the side gear 23 is, as shown in FIG. 7 for example, provided with clutch teeth 13 so as to be connectable with the clutch member 11; the combination of the clutch member 11 and the clutch teeth 13 thereby constitutes a clutch 10. When an actuator 1 drives the clutch member 11 so that the clutch 10 is connected, the side gear 23 and the case 15 temporarily operate as a unit to transmit the torque. As the other side gear 25 then cannot make differential motion relative to the side gear 23, the differential 3 loses its differential function and thus comes into a so-called differential lock state. When the actuator 1 causes the clutch 10 to be disconnected, the differential 3 differentially distributes the torque that the case 15 receives to both the axles.

Figure 3:
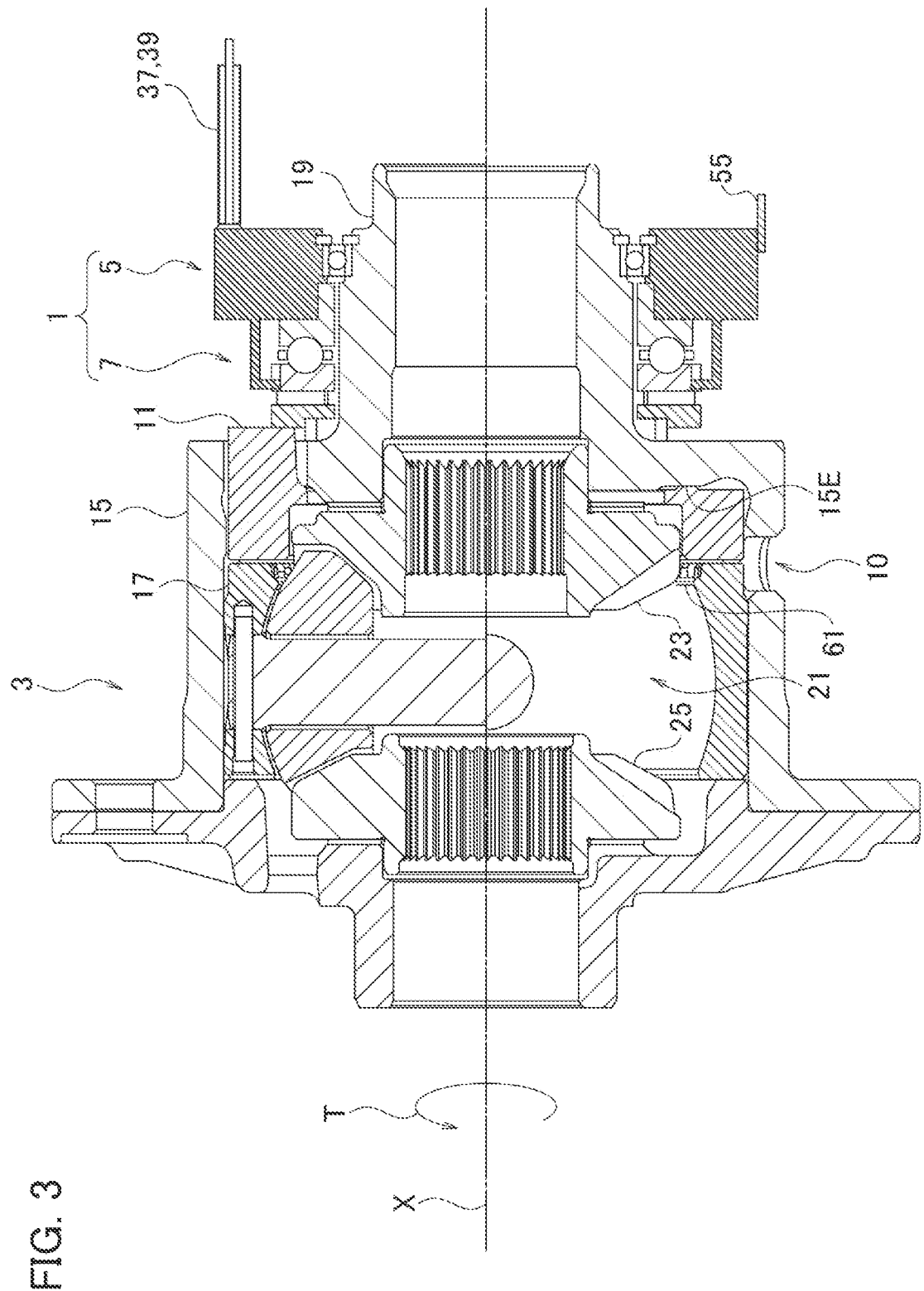
FIG. 3 is a sectional elevational view of a combination of a free-running differential and an actuator.

Alternatively, referring to FIG. 3, the case of the differential 3 may be divided into an outer case 15 for receiving the torque and an inner case 17 coaxial with and rotatable relative to the outer case. In this example, the differential gear set 21 is coupled with the inner case 17 and one end of the inner case 17 for example is provided with dog teeth to constitute the clutch 10. When the actuator 11 causes the clutch 10 to be connected, the torque is transmitted from the outer case 15 to the inner case 17 and further via the differential gear set 21 differentially distributed to both the axles. When the actuator 11 makes the clutch 10 disconnected, the differential gear set 21 cannot receive the torque from the outer case 15 and both the axles are thus freed from the power system.

It will be understood that a wide variety of rotary machines including dog clutches could be embodied in light of this disclosure and examples thereof include a transmission, a power transfer unit (PTU), a coupling device and such. Further, an exemplary type of the clutch is a so-called dog clutch, but any other types such as a claw clutch, or more generally a clutch having a structure that transmits torque not by friction but by mutual meshing, may be used.

In any embodiments described below, actuators need only make very simple linear motion as they are combined with meshing clutches. The respective embodiments, nevertheless, use hollow shaft motors that create not linear motion but rotational motion. Benefits offered thereby will become evident by the following explanation.

Referring back to FIG. 1, for example, the actuator 1 for driving the clutch 10 is in general provided with a hollow shaft motor 5 generating a rotational motion R about the axis X and a conversion mechanism that converts the rotational motion R into a linear motion in a direction along the axis X. The whole of the actuator 1 is coaxial with the rotary machine such as the differential 3, in particular with its boss portion 19, and is proximate to, or has contact with, one of end faces of the rotary machine, for example.

Figure 5:
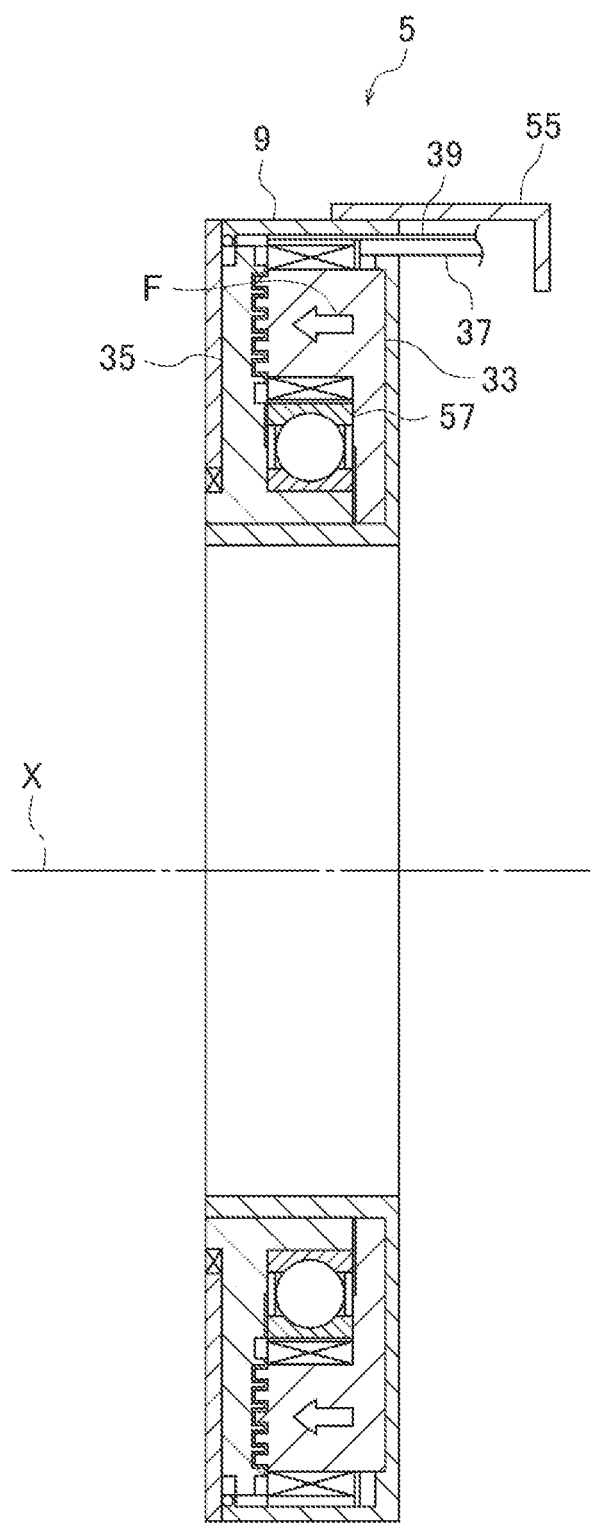
FIG. 5 is a sectional elevational view of an axial gap motor based on another example.
Figure 9:
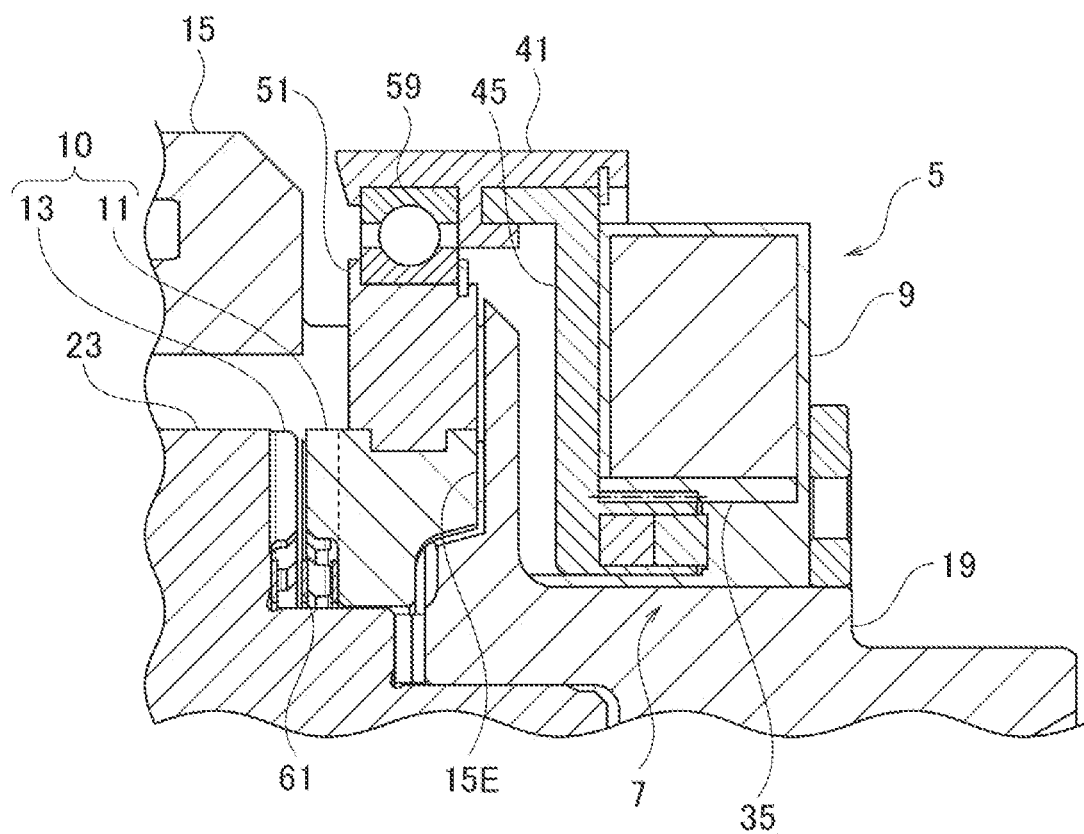
FIG. 9 is a sectional elevational view of the combination shown in FIG. 8.

Referring to FIG. 7 in combination with FIG. 1, the motor 5, or additionally a conversion mechanism 7 shown for example in FIG. 9, may be accommodated in a housing 9 and the housing 9 engages with a carrier included in the vehicle body and is thereby anti-rotated (i.e., prevented from rotation). The anti-rotation is realized by a relatively simple structure such as those shown by example in FIGS. 2, 3 and 5, and it may be enough to engage a tab 55 fixed to the outer periphery of the housing 9 with the carrier. The tab 55 may be elongated radially outwardly as shown in FIG. 2 or elongated axially as shown in FIGS. 3 and 5. The tab 55 may be fixed to another part of the housing 9 instead, or may be engaged thereto without fixation. Of course, in place of the tab, the housing 9 may be provided with any other structure directly engageable and its counterpart may be any element other than the carrier.

The housing 9 may, as well, fit on the boss portion 19 and further come in contact with, or fit to, the end face of the case 15. The end face of the case 15 may accordingly have a structure for fitting to the housing 9 and an example of such a structure is a circumferential slot being depressed so that the housing 9 can partly fit into the slot, or a flange elongated from the end face so as to partly fit on the housing 9. These structures are beneficial in offering stability to the motor 5 and the conversion mechanism 7 supported by the housing 9 and further in handling the whole of the device unitarily.

Figure 10:
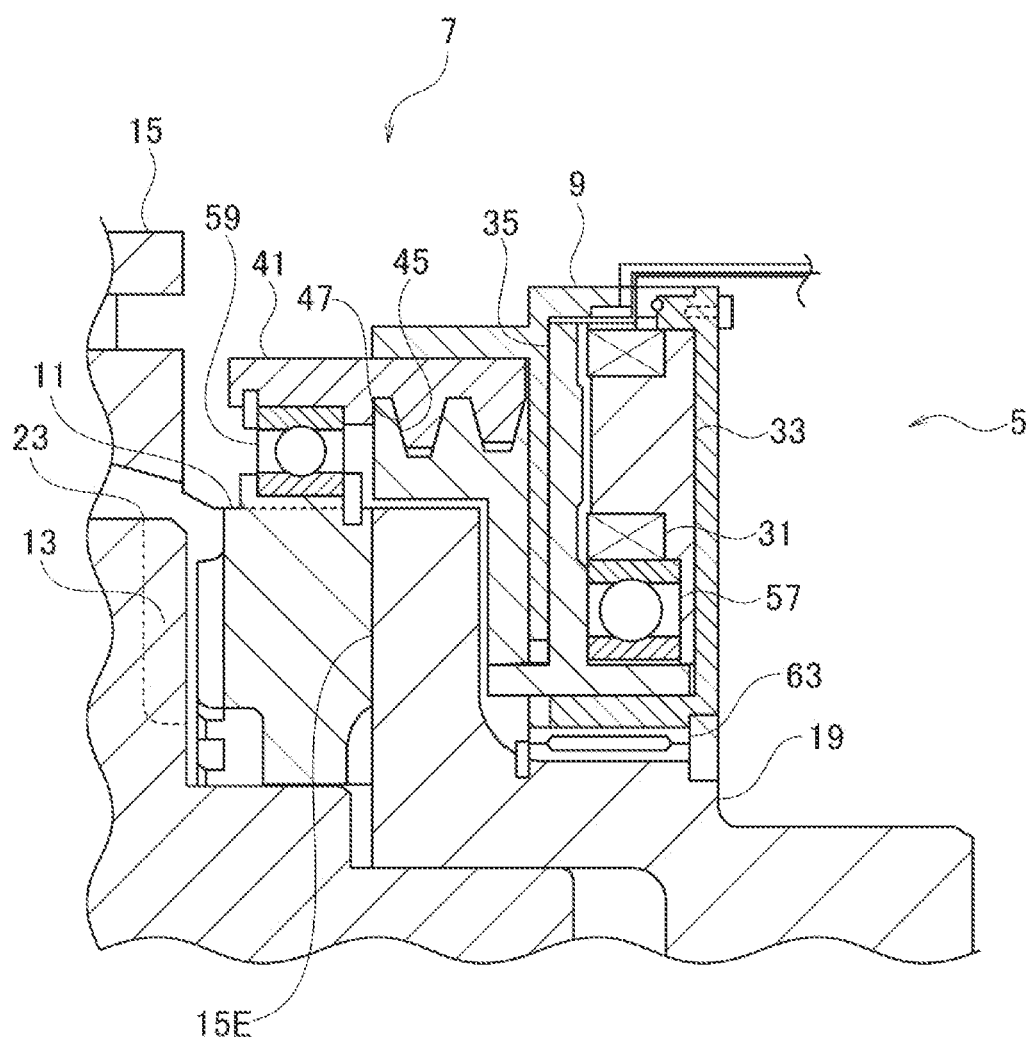
FIG. 10 is a sectional elevational view mainly showing an example of an actuator using screw threads.
Figure 14:
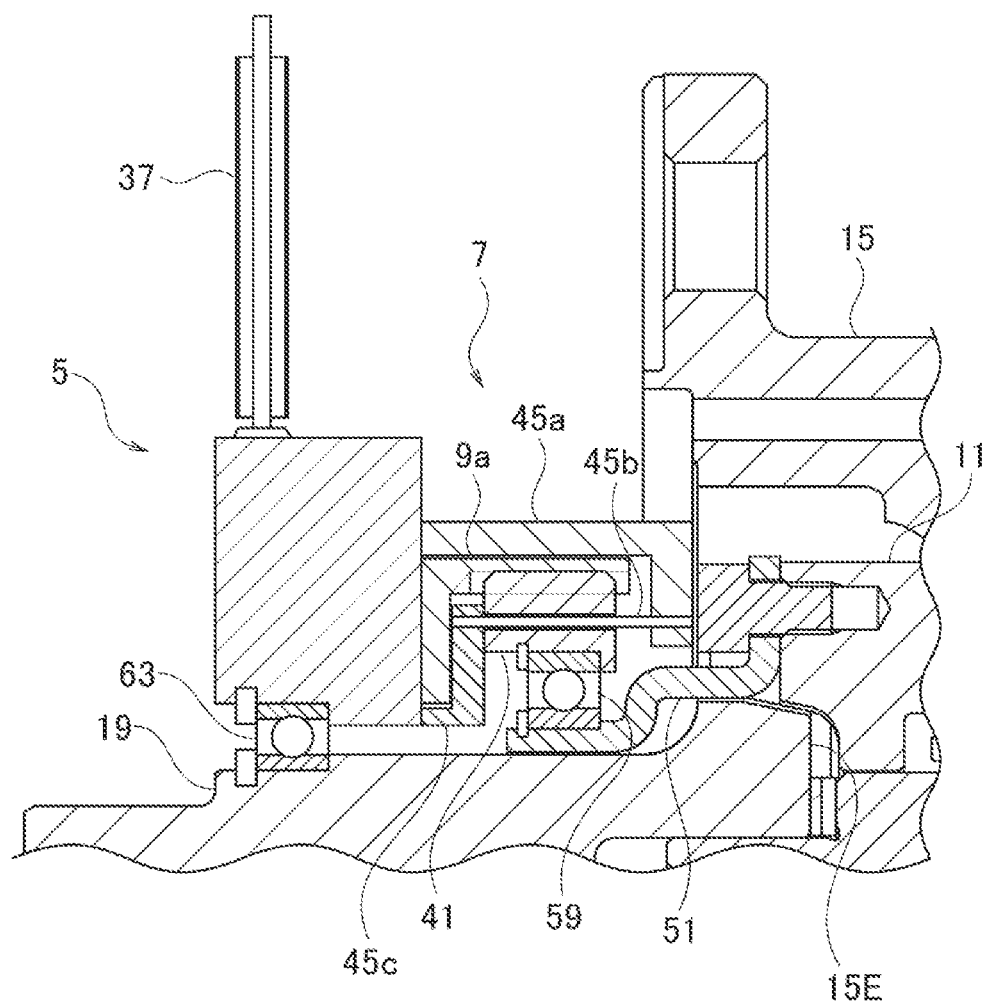
FIG. 14 is sectional elevational view mainly showing another example of an actuator using screw threads.
Figure 15:
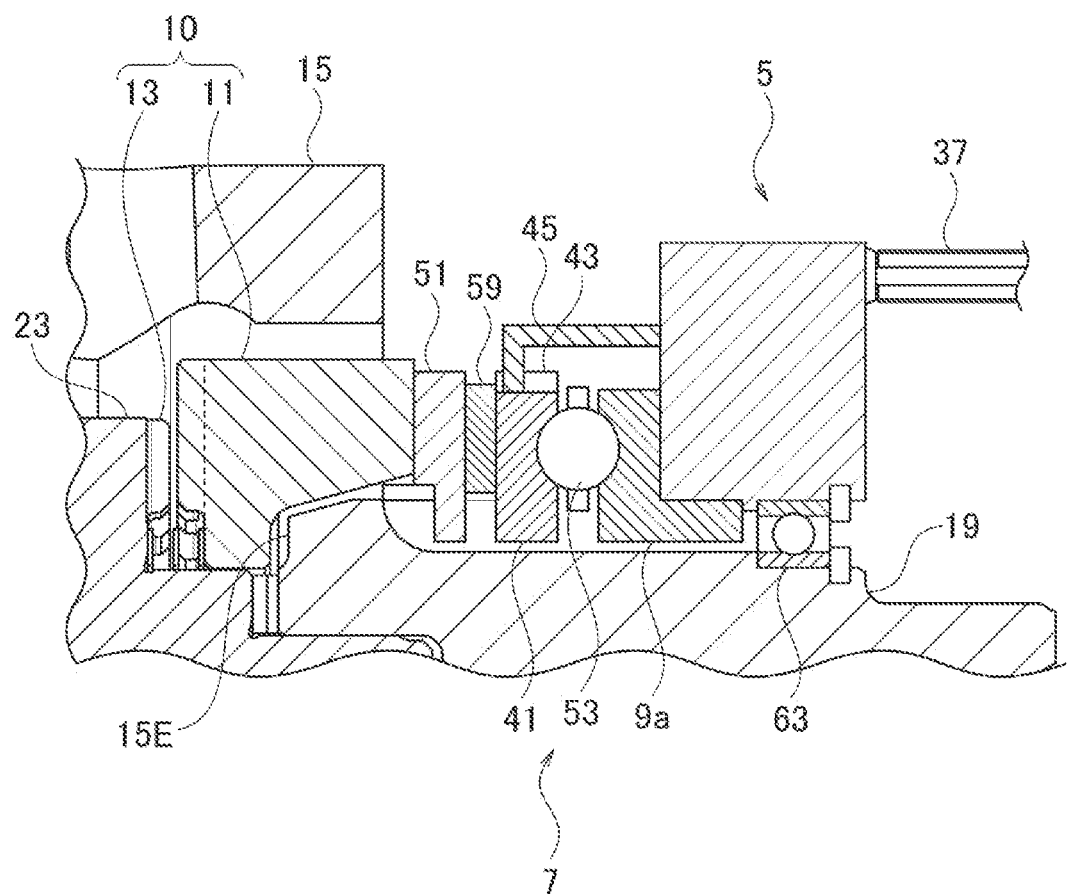
FIG. 15 is a sectional elevational view mainly showing an actuator composed of a ball cam mechanism.

The housing 9 slidably fits on the boss portion 19 and holds a relatively narrow gap therebetween, thereby catching lubricant oil into the gap. To hold the lubricant oil, oil grooves may be engraved on the inner periphery of the housing 9 or the outer periphery of the boss portion 19 or both. Alternatively, as shown in FIGS. 10, 14 and 15, a bearing 63 may be interposed between the housing 9 and the boss portion 19. As a not relatively great force acts on the actuator 1, a ball bearing may be used as the bearing 63 as shown in FIGS. 14 and 15, where a bearing of any other type such as a needle bearing as shown in FIG. 10 may of course be applied. Or, in place of or in addition to the bearing, any solid lubricant may be used, or low friction coatings of polyfluoroethylene or such may be applied to either or both of the housing 9 and the boss portion 19.

Figure 4:
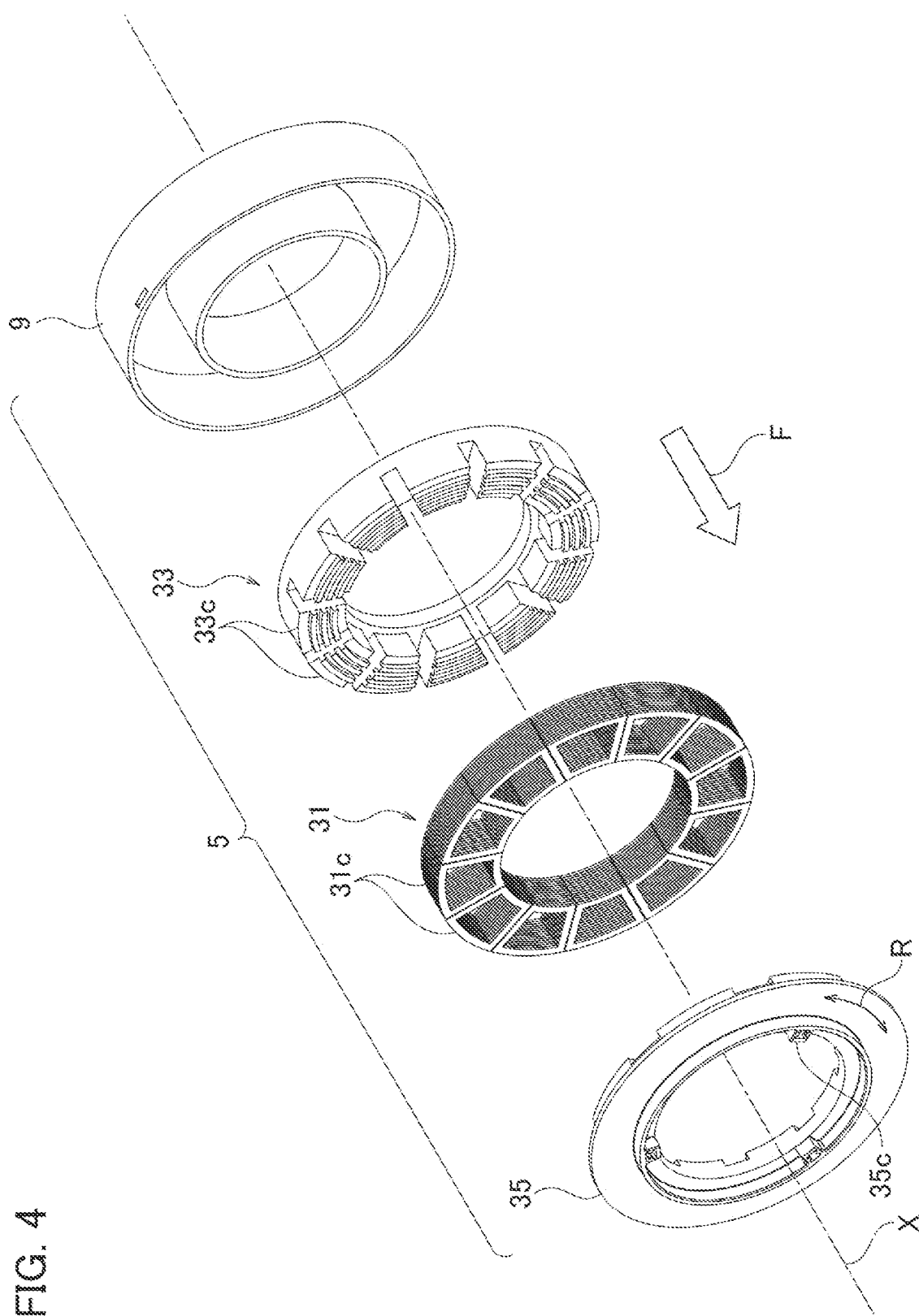
FIG. 4 is an exploded perspective view of an axial gap motor in the actuator shown in FIG. 1.

Referring to FIG. 4, for example, the motor 5 is generally provided with a solenoid 31 generating magnetic flux F in response to input of electric power, a stator 33 conducting the magnetic flux F, and a rotor 35 creating a rotational motion R about the axis X as driven by the received magnetic flux. The solenoid 31 may be a single electromagnetic coil but may be a group of plural coils 31c arranged circumferentially around the axis X. Each coil 31c may be wound around a core 33c formed of a soft magnetic material for example in order to efficiently draw out the magnetic flux F. The cores 33c may be further connected to each other so as to form a single unitary stator 33 or may be left separate to form the stator 33. The solenoid 31 may be formed in a unitary body with the stator 33. The stator 33 is, along with the solenoid 31, anti-rotated about the axis X relative to the housing 9, and preferably rendered axially immovable.

The rotor 35, formed of a magnetic material, is a substantially cylindrical body symmetrical about the axis X and is, as being not prevented from rotation, capable of creating rotational motion R about the axis X. To receive the magnetic flux F guided by the stator 33, the rotor 35 is disposed to be slightly apart in the direction of the axis X from, but face, the stator 33. While FIG. 4 depicts only a combination of a single rotor 35 and a single stator 33, a pair of stators 35 may be so arranged as to put a rotor 35 in between, or two or more pairs of stators 33 and rotors 35 may be arranged to form a row in the axial direction.

The stator 33 and the rotor 35 may be, as shown by example in FIG. 10, flat on mutually facing faces, but may form three-dimensional structures respectively so as to increase areas where the magnetic flux passes. One example of such structures may be, but not limited to, that as shown in FIGS. 4 and 5, where ribs of a concentric pattern stand on respective faces and enter in each other. Such structures are contributory to increase of torque and increase in use efficiency of electric power.

Figure 6:
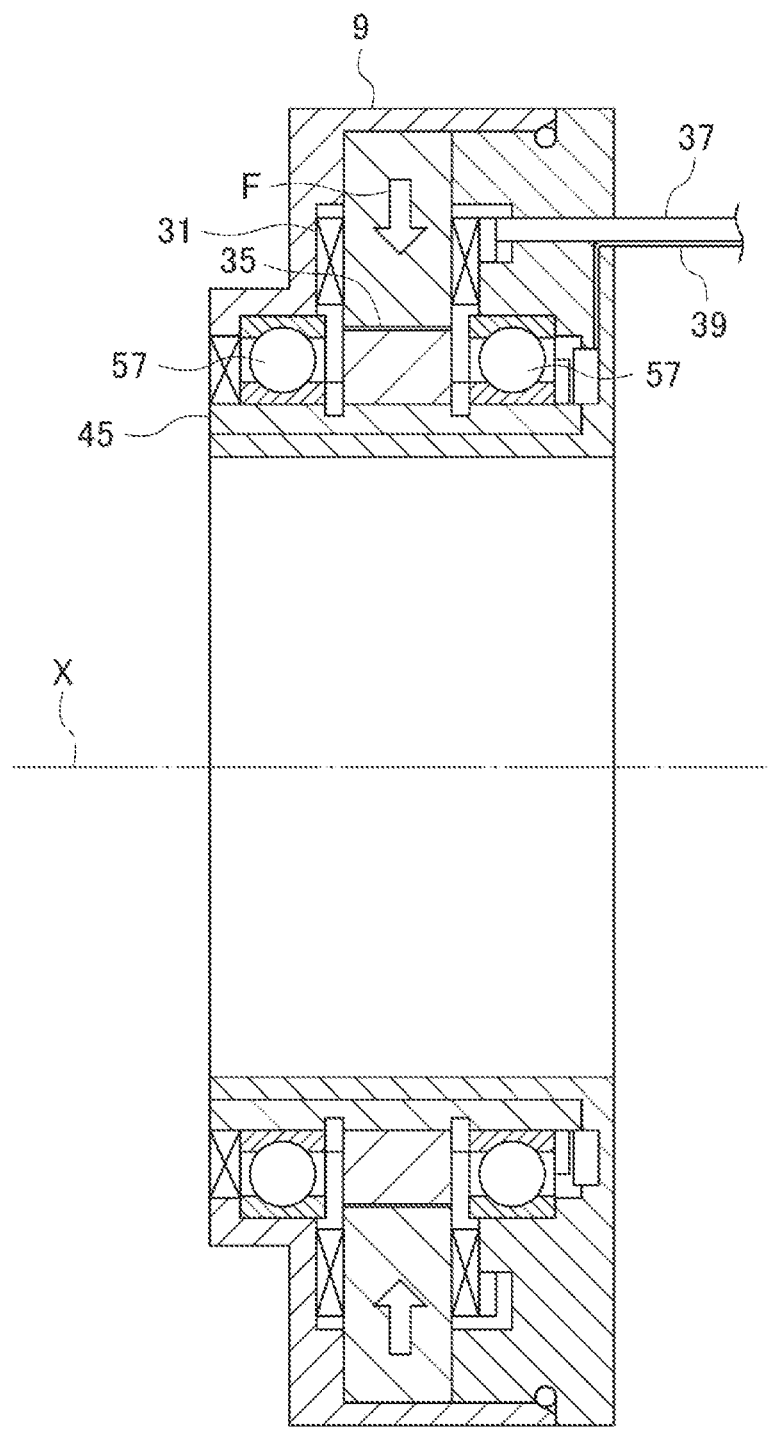
FIG. 6 is a sectional elevational view of a radial gap motor based on still another example.

The stator 33 and the rotor 35 are preferably retained proximate to each other. To retain the proximate positions, and as well to enable the rotor 35 to rotate smoothly, any bearing 57 such as a ball bearing may be interposed between the stator 33 and the rotor 35 as shown in FIGS. 5 and 10. Arrangement of the bearing 57 in the examples shown in the drawings is beneficial in counteracting the attractive power by the magnetic flux F to stabilize the rotor 35. Or, as shown in FIG. 6, the bearing 57 may be interposed between the housing 9 and the rotor 35. Meanwhile, as in the examples shown in FIGS. 5 and 10, the single bearing 57 may support the rotor, or, as in the example shown in FIG. 6, the rotor 35 may be put between and supported by the pair of bearings 57. The housing 9 may directly support the rotor 35 with having the bearing 57 interposed, or indirectly support the rotor 35 with any separate member coupled with the rotor (such as a rotary member 45 as described later for example). In the latter case, the bearing 57 may be interposed between the housing 9 and the rotary member 45. Further alternatively, instead of the housing 9, the boss portion 19 may support the rotor 35 or the rotary member 45, and the bearing 57 may be interposed between the boss portion 19 and the rotor 35 or the rotary member 45.

Any of the examples shown in FIGS. 4 and 5 relates to an axial gap motor, in which the rotor and the stator are arranged axially so that the magnetic flux F is extracted in parallel with the axis. In a case where the device has a larger clearance in the radial direction than that in the axial direction, the axial gap motor is advantageous to improvement of power output, or advantageous to size reduction with constant power. Axial gap motors may be arranged in tandem to improve power output. Of course, in place of the axial gap motor, as shown in FIG. 6 for example, a so-called radial gap motor may be used, in which a rotor is coaxial with a stator and is arranged closely radially outside or inside the stator to extract the magnetic flux F in the radial direction.

Referring to FIGS. 1, 5 and 6, for example, the solenoid 31 is connected through a cable 37 to a driver circuit at the outside. The driver circuit generates an alternate current having a phase shift or a pulse current and inputs it to the plurality of coils 31c to set the rotor 35 into the rotational motion R as shown in FIGS. 1 and 4. Directions of the rotational motion R can be regulated by means of directions of the phase shift, or more specifically, the motor 5 can create the rotational motion R in both normal and reverse directions. To generate the alternate or pulse current, any switching device is applicable and the switching device includes, but is not limited to, a semiconductor device such as an insulated gate bipolar transistor (IGBT) or such. The aforementioned explanation relates to a so-called induction motor but instead a synchronous motor, a permanent magnet type motor, a commutator motor, a direct current motor, or any various type, may be used.

Referring to FIGS. 1 and 2, for example, the conversion mechanism 7 is provided with a thrust member 41 and is drivingly coupled to the rotor 35, thereby converting its rotational motion R into a linear motion and outputting the motion to the thrust member 41. For the conversion, a cam mechanism, a ball cam mechanism, a screw mechanism, or a roller screw mechanism may be used for example. Legs of the clutch member 11 are led out to the exterior through the case 15, an end wall 15E thereof for example, to abut on or link with the thrust member 41, thereby driving it.

Referring to FIG. 7 in combination with FIGS. 1 and 2, on the basis of a cam mechanism for example, although not so limited, the thrust member 41 may be ring-like and, on the face opposed to the rotor 35, provided with cam faces 41c inclined in the circumferential direction. The rotor 35 is correspondingly provided with a structure suitable for sliding on the cam faces 41c. In the illustrated example, the conversion mechanism 7 is close to the innermost periphery of the rotor 35 but may be disposed closer to the outer periphery, or around the outermost periphery.

When the thrust member 41 is anti-rotated by the housing 9 and the rotor 35 creates a rotational motion R, the rotor 35 presses up the inclined cam faces 41c, or presses down it in a case of a reverse rotation, thereby converting the rotational motion R into a linear motion. To render the sliding motion smooth, rollers 53 capable of rolling may be interposed between the rotor 35 and the cam faces 41c. In the example shown in FIG. 1, the rotor 35 is provided with pockets 35c for holding rollers 53 and, as the rotor 35 rotates, the rollers 53 roll on the cam faces 41c so that the thrust member 41 is axially driven. In place of or in addition to the thrust member 41, the rotor 35 or any member united therewith may be provided with the cam faces. The roller 53 may be in a form of a cylinder or a truncated cone for example, or in a form of a sphere as shown for example in FIG. 15. The example shown in FIG. 15 may be considered as a kind of ball cam mechanism, which is advantageous in a case where greater output is required.

While the thrust member 41 may be directly in contact with the legs of the clutch member 11, as the former is anti-rotated but the latter rotates, mutual sliding motion is required. To facilitate the sliding motion, as shown by example in FIG. 9, 10, 11, 13, 14 or 15, a bearing 59 may be interposed therebetween. To the bearing 59 applicable is a ball bearing as shown for example in FIG. 9, 10, 11, 13 or 14, or a needle bearing as shown for example in FIG. 15, or any other type may be used. Or, instead of a bearing, solid lubricant member may be interposed or the sliding motion may be embodied on the basis of liquid lubricant interposition. The bearing 59 and the clutch member 11 may be directly coupled together as shown by example in FIG. 10, or any suitable tie member 51 may be further interposed to mediate driving force transmission as shown for example in FIG. 9, 11, 13, 14 or 15. The tie member 51 is a cylinder or a ring continuous in the circumferential direction for example and thus receives the bearing 59 similarly continuously in the circumferential direction, as shown by example in FIG. 14 or 15. Or, as shown by example in FIG. 9, 11 or 13, the tie member 51 may be not continuous in the circumferential direction but may be a plurality of members arranged at intervals in the circumferential direction. Further a plurality of members arranged in the circumferential direction may form a single tie member 51.

Figure 8:
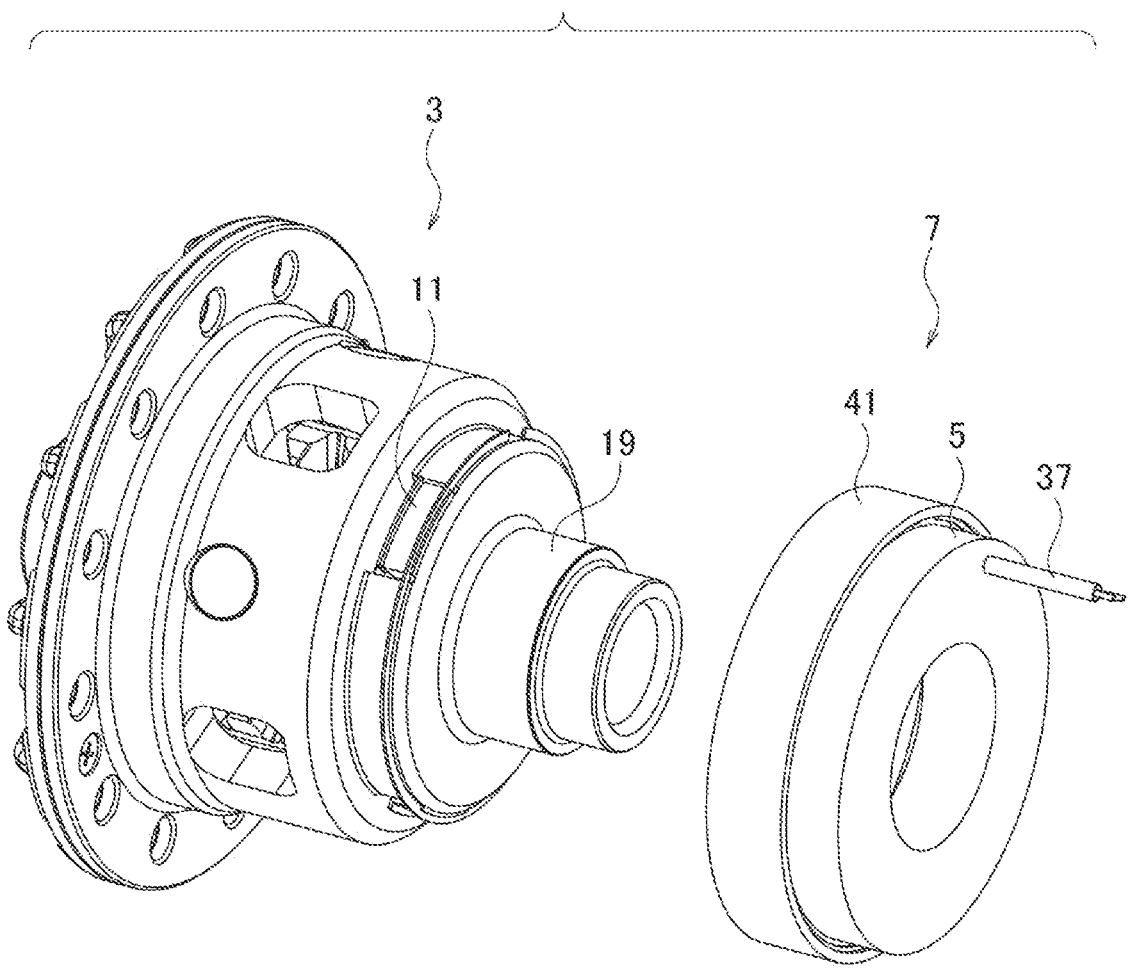
FIG. 8 is a partially exploded perspective view of a combination of a lock-up differential and an actuator according to another embodiment.

In the examples shown in FIGS. 1, 2, 7, 14 and 15, connection between the thrust member 41 and the clutch member 11 is established through through-holes penetrating the end wall 15E in the direction parallel with the axis X but instead the through-holes may, as shown by example in FIGS. 8 through 13, penetrate the casing 15, particularly the peripheral wall thereof, in the radial directions. Such a structure is advantageous for facilitation of production of the casing 15. To enable access in the radial directions, the thrust member 41 of the conversion mechanism 7 may be, as best shown in FIG. 8, like a cylinder elongated to cover the through-holes on the peripheral wall. As shown in FIGS. 8, 10 and 15, the clutch member 11 may be exposed through the through-holes to connect with the thrust member 41 but instead, as shown in FIGS. 9, 11, 13 and 14, the clutch member 11 may be not exposed through the through-holes and the tie member 51 may mediate the connection. In the latter cases, the tie member 51 is one or more blocks respectively corresponding to the through-holes and extend radially inward from the thrust member 41 to connect with the clutch member 11. Of course, in any cases, the bearing 59 may be interposed between the thrust member 41 and the clutch member 11.

In any cases, the contact of side faces of the legs of the clutch member 11 or the thrust member 41 with side faces of the through-holes can be used to keep clutch connection or promote its disconnection. The side faces of the through-holes may be, viewed in the circumferential direction, for example, inclined respectively and the side faces of the legs of the clutch member 11 or the thrust member 41 may be correspondingly inclined. As the inclined faces mutually contact one another, some part of the torque applied to the case 15 is converted into force in the axial direction. The converted force in the axial direction contributes to retention of clutch connection or promotion of disconnection. This is of course inessential in the respective embodiments.

The cam mechanism can drive the clutch member 11 in either direction where the clutch 10 is connected or disconnected but, in general, its operation in the disconnecting direction is relatively unreliable as compared with the connecting direction. Thus, to promote disconnection of the clutch member 11, any elastic body such as a spring is usable. In the examples shown in FIGS. 7, 9, 11 and 13, a spring 61 is interposed between the side gear 23 and the clutch member 11 to bias the clutch member 11 in the disconnecting direction. Further, contrary to the illustrated examples, the elastic body may be used to promote connection. Of course, the elastic body is not essential and inherent in these embodiments.

As described already, the conversion mechanism 7 may use a screw mechanism instead of the cam mechanism, in which a set of screw threads is screwed together as shown in FIG. 10 for example. The screw threads may be formed on a rotary member 45 as a separate body from the rotor 35 and as well the rotary member 45 may be pressed into or joined with the rotor 35. Alternatively, of course, the rotor 35 may be directly threaded. The counter screw threads may be formed on a counter member 47 as a separate body from the thrust body 41 or the counter member 47 may be a unitary body with the thrust body 41. Yet further alternatively, it is possible that one of them is threaded and the other has any suitable projections to be engaged with the threads. Yet further alternatively, any spiral tracks may be used in place of the screw threads and any rolling body or bodies may be interposed between the tracks. In the illustrated example, the thrust member 41 is in contact with and supported by an internal face of a cylinder elongated from the housing 9 and is as well anti-rotated, but may be supported and anti-rotated by any suitable means. When the motor 5 rotates the rotary member 45 (or the rotor), the anti-rotated thrust member 41 is pushed outward along the screw threads, or backward if rotating in the reverse direction, thereby converting the rotational motion R into the linear motion. Needless to say, as to the screw mechanism, there may be alternatives such as the example shown in FIG. 14 or various other forms.

Figure 12:
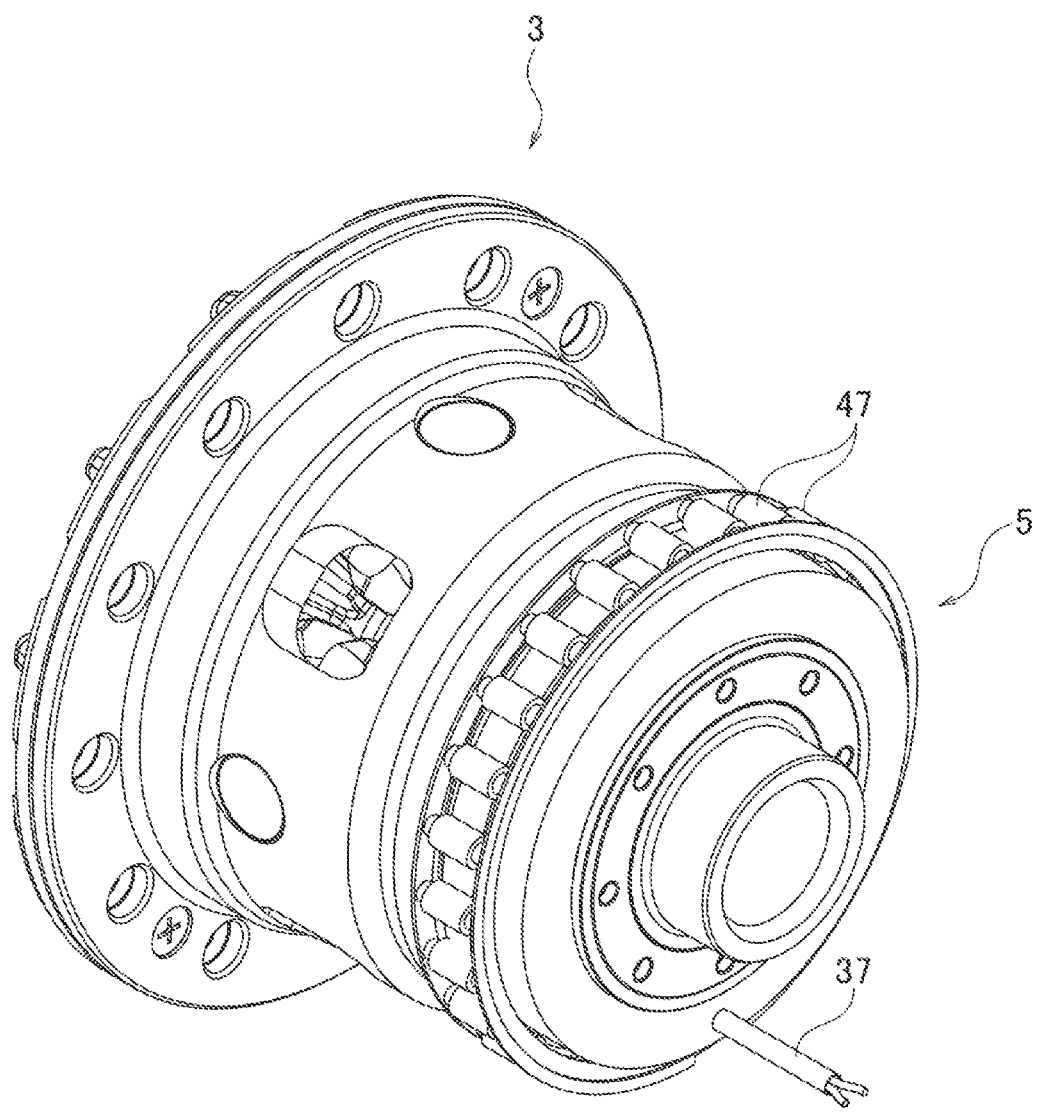
FIG. 12 is a perspective view of a combination of a lock-up differential and an actuator composed of a mechanism using roller screws, in which some parts are omitted.
Figure 13:
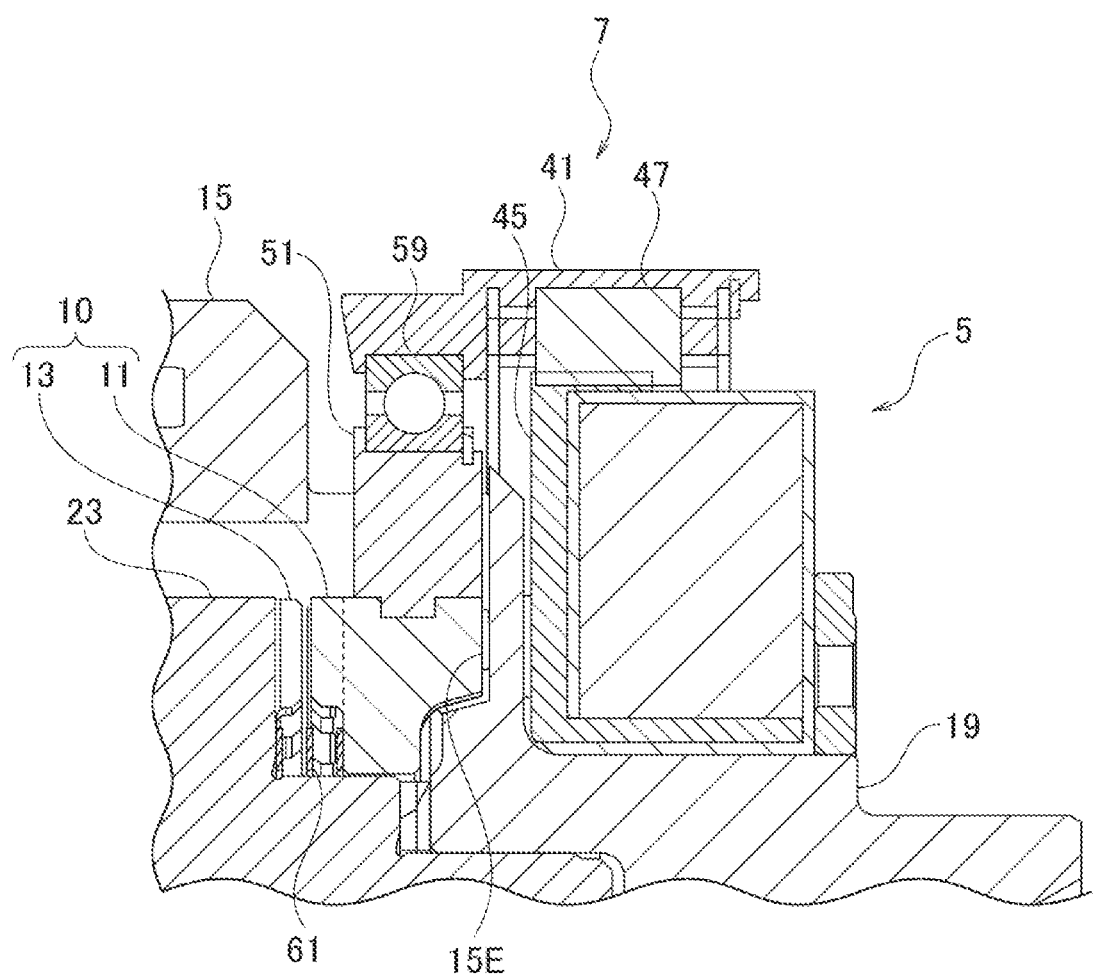
FIG. 13 is a sectional elevational view mainly showing an example of an actuator composed of a mechanism using roller screws.

Alternatively, a roller screw mechanism as shown by example in FIGS. 12 and 13 may be used. Referring mainly to FIG. 13, the rotary member 45, or the rotor 35 directly, is threaded to have screw threads and correspondingly counter members 47 each formed as a roller are threaded to mesh therewith. Each counter member 47 is directed axially and both ends are pivoted on the thrust member 41, thereby being rotatable. Although illustration of the thrust member 41 is omitted in FIG. 12, the counter member 47 may be arranged in the circumferential direction. The number of the counter member 47 is not limited to the example shown in the drawing but may be three or so, symmetrically, for example and of course may be more. The screw threads on the counter members 47 at least span so as to enable axial motion of itself and thus the counter members 47 are, when the rotary member 45 rotates, pushed outward along the screw threads, or backward if rotating in the reverse direction, thereby the thrust member 41 moves forward or backward.

As being understood from the aforementioned descriptions, as the screw mechanism or the roller screw mechanism could drive the clutch member 11 in both connecting and disconnecting directions, a repulsive body for assisting is not necessary. Of course, nevertheless, any repulsive body such as a spring 61 may be used.

In the embodiments described above, the thrust member 41 is anti-rotated and creates only linear motions to drive the clutch 10. Instead as described below, an alternative embodiment is possible in which a member creates both rotational motion urged by the motor 5 and also axial motion to drive the clutch 10.

Figure 11:
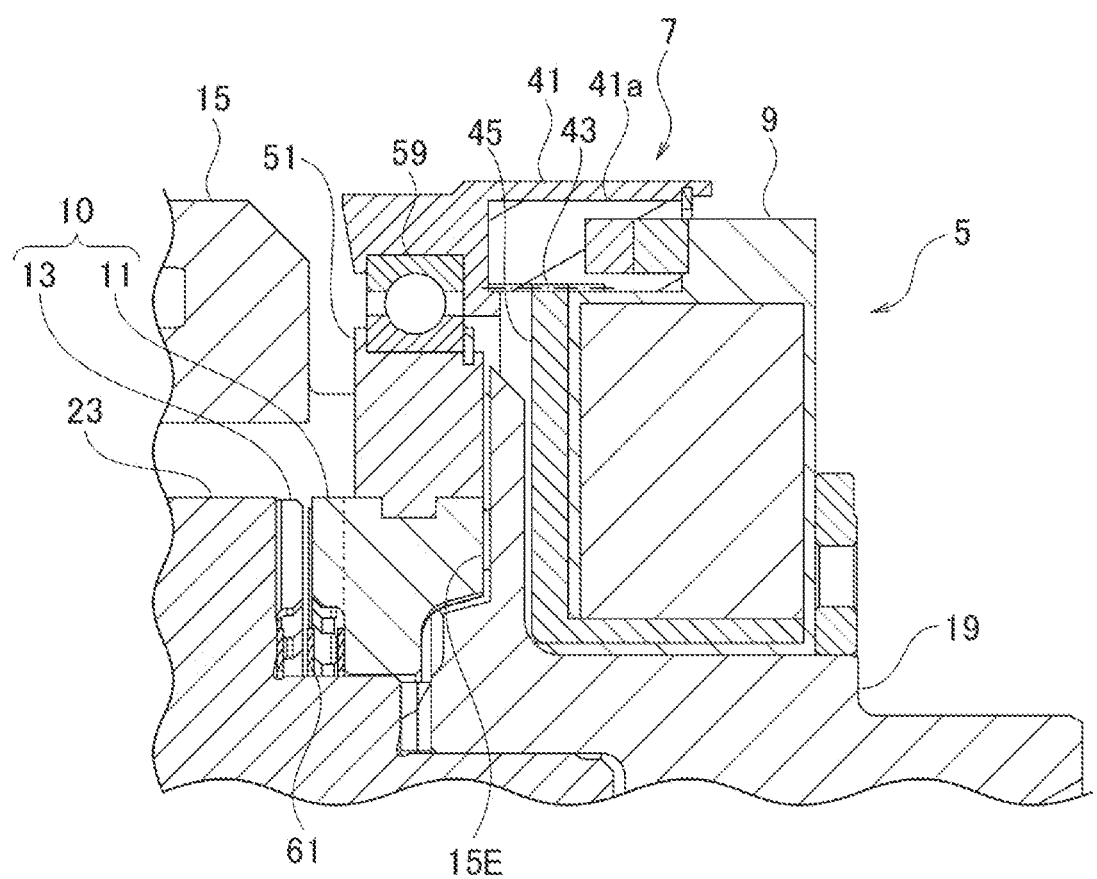
FIG. 11 is a sectional elevational view mainly showing an example of an actuator composed of a cam mechanism.

According to an example shown in FIG. 11, the anti-rotated housing 9 and a rotatable cam member 41a constitute the conversion mechanism 7. The conversion mechanism 7 may be a cam mechanism or instead a screw mechanism or any other appropriate mechanism. The rotary member 45 and the cam member 41a are connected by means of splines 43, for example, so that the rotational motion is transmitted from the rotary member 45 to the cam member 41a while the cam member 41a is axially movable relative to the rotary member 45. When the rotary member 45 rotates, the cam member 41a, with following the rotation, moves axially forward or backward by means of the conversion mechanism 7. The cam member 41a may be as in the illustrated example a separate body from and joined with the thrust member 41, or may form a unitary body therewith. Such a structure is, as the conversion mechanism 7 can be disposed radially outermost in the actuator 1, beneficial in monitoring the state of the actuator 1 through a sensor disposed outside for example. Of course, different from the illustrated example, the conversion mechanism 7 may be disposed more inwardly.

What is shown by example in FIG. 14 is another example using a screw mechanism. An internal periphery of an anti-rotated ring-like stand 9a is threaded and the thrust member 41, by being screwed in the screw threads, creates forward or backward motion in the axial direction. To transmit the rotation from the motor 5 to the thrust member 41, a pin or rod 45b is usable and one or both ends of the pin or rod 45b are secured to rotary members 45a, 45c. The pin or rod 45b may penetrate the thrust member 41 to transmit the rotation or use any coupling such as a key as described later, which allows axial migration. The thrust member 41 follows the rotary members 45a, 45c to rotate and is also movable in the axial direction. Also in this example, at least the rotary member 45a is exposed radially outward and therefore the structure is beneficial in monitoring its rotation angle. Meanwhile the pin or rod 45b is parallel with the axis but may be suitably oblique.

The thrust member 41 may be directly coupled with the clutch member 11 but may have the interposed tie member 51. In the latter example, the tie member 51 is in general a cylinder slidably fitting on the boss portion 19 of the case 15 and coupled with the thrust member 41 so as to unitarily move at least in the axial direction. The coupling may be a fitting that allows mutual sliding in the circumferential direction but may have a bearing 59 interposed therebetween. More specifically, the tie member 51 is circumferentially rotatable relative to the thrust member 41. The tie member 51 is at least partly elongated toward the clutch member 11 and coupled therewith. Bolts for example and without limitation could be used for the coupling. On the basis of the disclosed structure, when the thrust member 41 moves axially, the clutch member 11 unitarily moves axially while the clutch member 11 is rotatable relative to the thrust member 41.

Another example is shown in FIG. 15. The rotary member 45 is axially elongated from the motor 5 to connect with the thrust member 41. The connection is established by a combination of keys and keyways, for example, and thus the thrust member 41 follows the rotary member 45 to rotate and is also movable in the axial direction. Between the ring-like stand 9a supported and anti-rotated by the housing 9 and the thrust member 41, cam balls 53 are interposed, and one or both of the thrust member 41 and the counter ring 9a are provided with cam faces inclined in the circumferential direction. When the motor 5 rotates the rotatory member 45, the cam balls 53 roll over the cam faces to drive the thrust member 41 in the axial direction. Also in this example, as the clutch member 11 rotates relative to the thrust member 41, the bearing 59 may be interposed between the thrust member 41 and the clutch member 11, and the tie member 51 may hold the bearing 59. Also in this example, as at least the rotary member 45 is exposed radially outwardly, the structure is beneficial in monitoring its rotation angle.

Further the tie member 51 is secured to one of the legs of the clutch member 11 and the bearing 59, and may be separable from the other. According to this example, an assembly method, in which the motor 5 and the conversion mechanism 7 are independently assembled in advance and these assemblies are unitarily installed into the differential 3, is readily available.

The conversion mechanism 7 may be, as shown by example in FIG. 9, disposed radially inside the motor 5 or, as shown by example in FIG. 11 or 13, the conversion mechanism 7 may be disposed radially outside. In any case, the hollow shaft motor 5 and the conversion mechanism 7 are coaxial in the actuator 1 and may form a nested structure where one lies inside the other, thereby being structured axially and radially compact. Of course as shown by example in FIG. 7, 10, 14 or 15, the motor 5 and the conversion mechanism 7 may mutually adjoin in the axial direction and this construction can render the whole of the actuator 1 more compact in the radial direction and also sufficiently compact in the axial direction.

As being understood from the respective drawings, the whole of the actuator 1 does not extend considerably in the radial direction from the rotary machine, and has a size in the radial direction similar to or less than the rotary machine in general. It is particularly noted that the actuator 1 according to any of the embodiments is, as being dimensioned similar to the prior solenoid actuators applied to differentials, compatibly usable in place of the prior solenoid actuator without design changes in the vehicle body.

The actuator 1 of any of the embodiments can, throughout, before, and after driving the clutch member 11, keep the position of the thrust member 41 without electric power input. Therefore it does not require additional members or structures to keep connection and disconnection of the clutch. This is advantageous in to increase of freedom of design and also reduce costs.

As the actuator 1 is not combined with a friction clutch that requires great driving force, relatively low-strength materials such as resins are applicable to the rotary member 45 and the thrust member 41, and this is advantageous in light of prevention of magnetic flux leakage and is resultantly advantageous in light of reduction in electric power consumption. Further, for the purpose of reduction of friction loss for example, any resin such as polytetrafluoroethylene is applicable.

As being understood from the descriptions so far, the actuator 1 can drive the thrust member 41 axially in both the connecting and disconnecting directions and the clutch member 11 follows this. As the operation of the actuator 1 necessarily reflects the state of the clutch member 10, it is sufficient to monitor the actuator for monitoring the state of the clutch and therefore the device need not additionally have any device for detecting whether the clutch is connected or disconnected. The state of the actuator can be directly noticed from the rotation angle of the rotor. As change in the positional relation between the rotor and the stator causes cyclic change in inductance of the motor, the rotation angle can be noticed by electrically counting the inductance change. Therefore the state of the clutch can be detected by an electric circuit or a software without any additional device. Of course, it is possible that a structure such as an encoder is attached to the rotor 35 so as to, by means of a contactless sensor, detect the rotation angle and the motor 5 may have these structure and device built-in. In order to read out information to the exterior, as shown in FIGS. 5 and 6, a cable 39 independent of the cable 37 may be provided for supplying electricity. These elements contribute to facilitating installation into the vehicle body. Or, the encoder may be attached to any member capable of being exposed outward, such as the rotary member 45, and the vehicle body may read information therefrom. Even in this case, the vehicle body does not necessarily require considerable design change and its installation is not troublesome.

As the rotor or the rotary member in any of the embodiments is necessarily large in diameter and its peripheral velocity is therefore large, the actuator and the thrust member can be rapidly driven and therefore rapidly make the clutch connected and disconnected. This can offer excellent response as compared with hydraulic cylinders or motor cam mechanisms in the prior art.

Although certain exemplary embodiments are described above, modifications and variations of the embodiments may occur to those skilled in the art, in light of the above teachings.

What is claimed is:

1. A power transmission device disconnectably transmitting torque for driving a vehicle, comprising:
    a rotary body arranged to receive the torque to rotate about an axis;
    a clutch including a clutch member engaging with the rotary body and being axially movable, and clutch teeth connectable with the clutch member to transmit the torque;
    a solenoid configured to generate a magnetic flux in response to input of electric power;
    a stator coupled with the solenoid to conduct the magnetic flux, and prevented from rotation about the axis;
    a rotor arranged to receive the magnetic flux from the stator and, when driven by the received magnetic flux, to create a rotational motion about the axis;
    a conversion mechanism drivingly connected with the rotor to convert the rotational motion into a linear motion in a direction along the axis, the conversion mechanism including a thrust member transmitting the linear motion to the clutch member; and
    a differential gear set including a pair of side gears for differentially outputting the torque,
    wherein the clutch teeth are formed on one of the side gears or an inner casing supporting the differential gear set.

2. The power transmission device of claim 1, wherein at least the stator and the rotor are coaxial with the rotary body and form respective rings around the axis.

3. The power transmission device of claim 1, further comprising:
    a housing accommodating the solenoid, the stator, and the rotor, and being prevented from rotation about the axis, thereby to prevent rotation of the stator and the thrust member.

4. The power transmission device of claim 1, wherein one or both of the rotor and the thrust member include cam faces, screw threads, or spiral tracks so inclined as to convert the rotational motion into the linear motion.

5. The power transmission device of claim 1, wherein the conversion mechanism includes a tie member to couple with the clutch member, and a bearing interposed between the thrust and the tie member to allow relative rotation and mediate the linear motion.

6. The power transmission device of claim 1, wherein a combination of the stator and the rotor constitutes an axial gap motor in that the stator and the rotor are axially distant from each other.

7. The power transmission device of claim 1, wherein a combination of the stator and the rotor constitutes a radial gap motor in that the stator and the rotor are distant from each other in a radial direction perpendicular to the axis.

8. A power transmission device disconnectably transmitting torque for driving a vehicle, comprising:
    a rotary body arranged to receive the torque to rotate about an axis;
    a clutch including a clutch member engaging with the rotary body and being axially movable, and clutch teeth connectable with the clutch member to transmit the torque;
    a solenoid configured to generate a magnetic flux in response to input of electric power;
    a stator coupled with the solenoid to conduct the magnetic flux, and prevented from rotation about the axis;
    a rotor arranged to receive the magnetic flux from the stator and, when driven by the received magnetic flux, to create a rotational motion about the axis; and
    a conversion mechanism drivingly connected with the rotor to convert the rotational motion into a linear motion in a direction along the axis, the conversion mechanism including a thrust member transmitting the linear motion to the clutch member,
    wherein a combination of the stator and the rotor constitutes an axial gap motor in that the stator and the rotor are axially distant from each other.

9. The power transmission device of claim 8, further comprising:
    a differential gear set including a pair of side gears for differentially outputting the torque,
    wherein the clutch teeth are formed on one of the side gears or an inner casing supporting the differential gear set.

10. The power transmission device of claim 8, wherein at least the stator and the rotor are coaxial with the rotary body and form respective rings around the axis.

11. The power transmission device of claim 8, further comprising:
    a housing accommodating the solenoid, the stator, and the rotor, and being prevented from rotation about the axis, thereby to prevent rotation of the stator and the thrust member.

12. The power transmission device of claim 8, wherein one or both of the rotor and the thrust member include cam faces, screw threads, or spiral tracks so inclined as to convert the rotational motion into the linear motion.

13. The power transmission device of claim 8, wherein the conversion mechanism includes a tie member to couple with the clutch member, and a bearing interposed between the thrust and the tie member to allow relative rotation and mediate the linear motion.

* * * * *